(12) United States Patent
Yang et al.

(10) Patent No.: US 12,047,109 B2
(45) Date of Patent: Jul. 23, 2024

(54) ELECTRONIC DEVICE INCLUDING ANTENNA STRUCTURE

(71) Applicant: Samsung Electronics Co., Ltd., Suwon-si (KR)

(72) Inventors: Sungkwang Yang, Suwon-si (KR); Jongmin Yoon, Suwon-si (KR); Juhwan Yun, Suwon-si (KR); Donguk Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 204 days.

(21) Appl. No.: 17/858,547

(22) Filed: Jul. 6, 2022

(65) Prior Publication Data

US 2023/0076226 A1 Mar. 9, 2023

Related U.S. Application Data

(63) Continuation of application No. PCT/KR2022/007153, filed on May 19, 2022.

(30) Foreign Application Priority Data

Sep. 9, 2021 (KR) .................. 10-2021-0120554

(51) Int. Cl.
*H04M 1/724* (2021.01)
*G06F 1/16* (2006.01)
(Continued)

(52) U.S. Cl.
CPC ............. *H04B 1/385* (2013.01); *G06F 1/163* (2013.01); *H04B 2001/3866* (2013.01)

(58) Field of Classification Search
CPC .. H04B 1/385; H04B 2001/3866; H04B 1/08; H04M 1/724094; H04M 1/724097; H01Q 1/273; G06F 1/163; G06F 1/1698
See application file for complete search history.

(56) References Cited

U.S. PATENT DOCUMENTS 9,547,335 B1 1/2017 Bevelacqua et al.
10,193,213 B2 * 1/2019 Liu ..................... G06F 1/1641
(Continued)

FOREIGN PATENT DOCUMENTS

JP 2002-247484 A 8/2002
JP 2017-175438 A 9/2017
(Continued)

OTHER PUBLICATIONS

International Search Report dated Aug. 26, 2022, issued in International Application No. PCT/KR2022/007153.
(Continued)

*Primary Examiner* — Andrew Wendell
(74) *Attorney, Agent, or Firm* — Jefferson IP Law, LLP

(57) ABSTRACT

An electronic device is provided. The electronic device includes a lens frame configured to accommodate a display member and including a first end and a second end opposite to the first end, wearing member including a first wearing member connected to the first end and a second wearing member connected to the second end, antenna structure including a first antenna structure disposed within the first wearing member and a second antenna structure disposed within the second wearing member, connecting member including a first connecting member at least partially disposed within the first wearing member, a second connecting member at least partially disposed within the second wearing member and electrically connected to the second antenna structure, and a third connecting member disposed within the lens frame and electrically connected to the first connecting member and the second connecting member, and a communication module disposed within the first wearing member, electrically connected to the first antenna structure, and electrically connected to the second antenna structure via the connecting member.

20 Claims, 9 Drawing Sheets

(51) Int. Cl.
*H04B 1/03* (2006.01)
*H04B 1/08* (2006.01)
*H04B 1/3827* (2015.01)

(56) References Cited

U.S. PATENT DOCUMENTS

| | | | |
|---|---|---|---|
| 11,404,918 B2* | 8/2022 | Halyal | H02J 50/90 |
| 11,929,547 B2* | 3/2024 | Tsai | H01Q 9/04 |
| 2008/0055537 A1 | 3/2008 | Asrani et al. | |
| 2014/0273893 A1* | 9/2014 | Katayama | H04N 5/64 |
| | | | 455/90.3 |
| 2016/0005233 A1 | 1/2016 | Fraccaroli et al. | |
| 2016/0204839 A1 | 7/2016 | Liu et al. | |
| 2016/0238692 A1 | 8/2016 | Hill et al. | |
| 2017/0179580 A1* | 6/2017 | Park | H01Q 5/371 |
| 2017/0279188 A1 | 9/2017 | Hiramatsu | |
| 2018/0093177 A1 | 4/2018 | Tokubo | |
| 2018/0212314 A1* | 7/2018 | Rautio | G02C 5/22 |
| 2019/0033622 A1* | 1/2019 | Olgun | H04B 5/24 |
| 2019/0041666 A1 | 2/2019 | Abele et al. | |
| 2019/0113967 A1 | 4/2019 | Tokubo | |
| 2019/0196228 A1 | 6/2019 | Moore et al. | |
| 2019/0198981 A1* | 6/2019 | Moore | G02C 3/003 |
| 2019/0229395 A1 | 7/2019 | Hintermann et al. | |
| 2020/0393685 A1 | 12/2020 | Isaacs et al. | |
| 2021/0097364 A1* | 4/2021 | Salsberg | G06K 19/07788 |
| 2021/0149224 A1 | 5/2021 | Zhang et al. | |
| 2023/0057121 A1* | 2/2023 | Prasannakumar | H01Q 1/521 |

FOREIGN PATENT DOCUMENTS

| | | |
|---|---|---|
| KR | 10-2009-0045927 A | 5/2009 |
| KR | 10-2017-0091692 A | 8/2017 |
| KR | 10-2020-0106207 A | 9/2020 |

OTHER PUBLICATIONS

Written Opinion dated Aug. 26, 2022, issued in International Application No. PCT/KR2022/007153.

* cited by examiner

ELECTRONIC DEVICE INCLUDING ANTENNA STRUCTURE

CROSS-REFERENCE TO RELATED APPLICATION(S)

This application is a continuation application, claiming priority under § 365(c), of an International application No. PCT/KR2022/007153, filed on May 19, 2022, which is based on and claims the benefit of a Korean patent application number 10-2021-0120554, filed on Sep. 9, 2021, in the Korean Intellectual Property Office, the disclosure of which is incorporated by reference herein in its entirety.

TECHNICAL FIELD

The disclosure relates to an electronic device including an antenna structure.

BACKGROUND ART

With the development of electronic and communication technologies, electronic devices can be reduced in size and weight to such an extent that the electronic devices can be used without great inconvenience even when the electronic devices are worn on a user's body. For example, wearable electronic devices, such as a head mounted device (HMD), a smartwatch (or band), a contact lens-type device, a ring-type device, a glove-type device, a shoe-type device, or a clothing-type device, are commercially available. Since the wearable electronic devices are directly worn on a user's body, portability and user accessibility may be improved.

A head mounted device is a device used in the state of being worn on a user's head or face and may provide augmented reality (AR) to the user. For example, a head mounted device providing augmented reality may be implemented in the form of glasses, and may provide information about an object in the form of an image or text to the user in at least a partial space of the user's field of view. The head mounted device may provide virtual reality (VR) to the user. For example, by outputting independent images to the user's both eyes, respectively, and outputting a content provided from an external input to the user in the form of an image or sound, the head mounted device may provide an excellent sensation of immersion.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

A wearable electronic device may include an antenna structure configured to communicate with an external electronic device or a server. The wearable electronic device may include a plurality of antenna structure to increase data transmission speed and/or transmitted data capacity. However, when a plurality of antenna structure are disposed within one wearing member, an antenna coverage may be reduced. In addition, in an electronic device in which a plurality of antenna structure are disposed within different wearing member and are connected to a communication module via a single connecting member, a loss of a radio signal may occur.

Aspects of the disclosure are to address at least the above-mentioned problems and/or disadvantages and to provide at least the advantages described below. Accordingly, an aspect of the disclosure is to provide an electronic device having an increased antenna coverage by using antenna structure disposed within both wearing member.

Another aspect of the disclosure is to provide an electronic device that is capable of reducing or preventing a loss of radio frequency signals by using a first and second connecting member facing hinge structure, and a third connecting member disposed within a lens frame.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a lens frame configured to accommodate a display member and including a first end and a second end opposite to the first end, wearing member including a first wearing member connected to the first end and a second wearing member connected to the second end, antenna structure including a first antenna structure disposed within the first wearing member and a second antenna structure disposed within the second wearing member, connecting member including a first connecting member at least partially disposed within the first wearing member, a second connecting member at least partially disposed within the second wearing member and electrically connected to the second antenna structure, and a third connecting member disposed within the lens frame and electrically connected to the first connecting member and the second connecting member, and a communication module disposed within the first wearing member, electrically connected to the first antenna structure, and electrically connected to the second antenna structure via the connecting member.

In accordance with another aspect of the disclosure, an electronic device is provided. The electronic device includes a lens frame configured to accommodate a display member, a first wearing member rotatably connected to the lens frame, a second wearing member rotatably connected to the lens frame and spaced apart from the first wearing member, a first antenna structure disposed within the first wearing member, a second antenna structure disposed within the second wearing member, a first connecting member at least partially disposed within the first wearing member and electrically connected to the first antenna structure, a second connecting member at least partially disposed within the second wearing member and electrically connected to the second antenna structure, a third connecting member disposed within the lens frame and electrically connected to the first connecting member and the second connecting member, and a communication module disposed within the first wearing member, and electrically connected to the second antenna structure via the first connecting member, the third connecting member, and the second connecting member.

In accordance with another aspect of the disclosure, an electronic device is provided. The electronic includes a first wearing member configured to accommodate a communication module and a first circuit board electrically connected to the communication module, a second wearing member configured to accommodate an antenna structure and a second circuit board electrically connected to the antenna structure, a first signal transmission member at least partially disposed within the first wearing member and electrically connected to the first circuit board, a second signal transmission member at least partially disposed within the second wearing member and electrically connected to the second circuit board, a lens frame configured to accommodate a third signal transmission member, a first hinge structure physically connected to a first end of the lens frame and the first wearing member and configured to guide rotation of the first wearing member relative to the lens frame, and a second hinge structure physically connected to a second end of the lens frame and the second wearing member and configured to guide rotation of the second wearing member relative to the lens frame, wherein an antenna structure located within the second wearing member may be configured to transmit a communication signal received by the antenna structure to the first communication module located within the first wearing member via the first signal transmission member, the third signal transmission member, and the second signal transmission member.

Advantageous Effects

An electronic device according to various embodiments of the disclosure may include a plurality of antenna structure disposed within different wearing member. By disposing the antenna structure in the left wearing member and the right wearing member, respectively, an antenna coverage area of the electronic device can be increased.

An electronic device according to various embodiments of the disclosure may include connecting member for electrically connecting antenna structure disposed in different wearing member to a communication module. The connecting member may include first and second connecting member that are foldable or unfoldable together with the hinge modules, and a third connecting member disposed within the lens frame. Since signals received from the antenna structure are transmitted to the communication module via the connecting member, radio frequency loss of the electronic device can be reduced.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
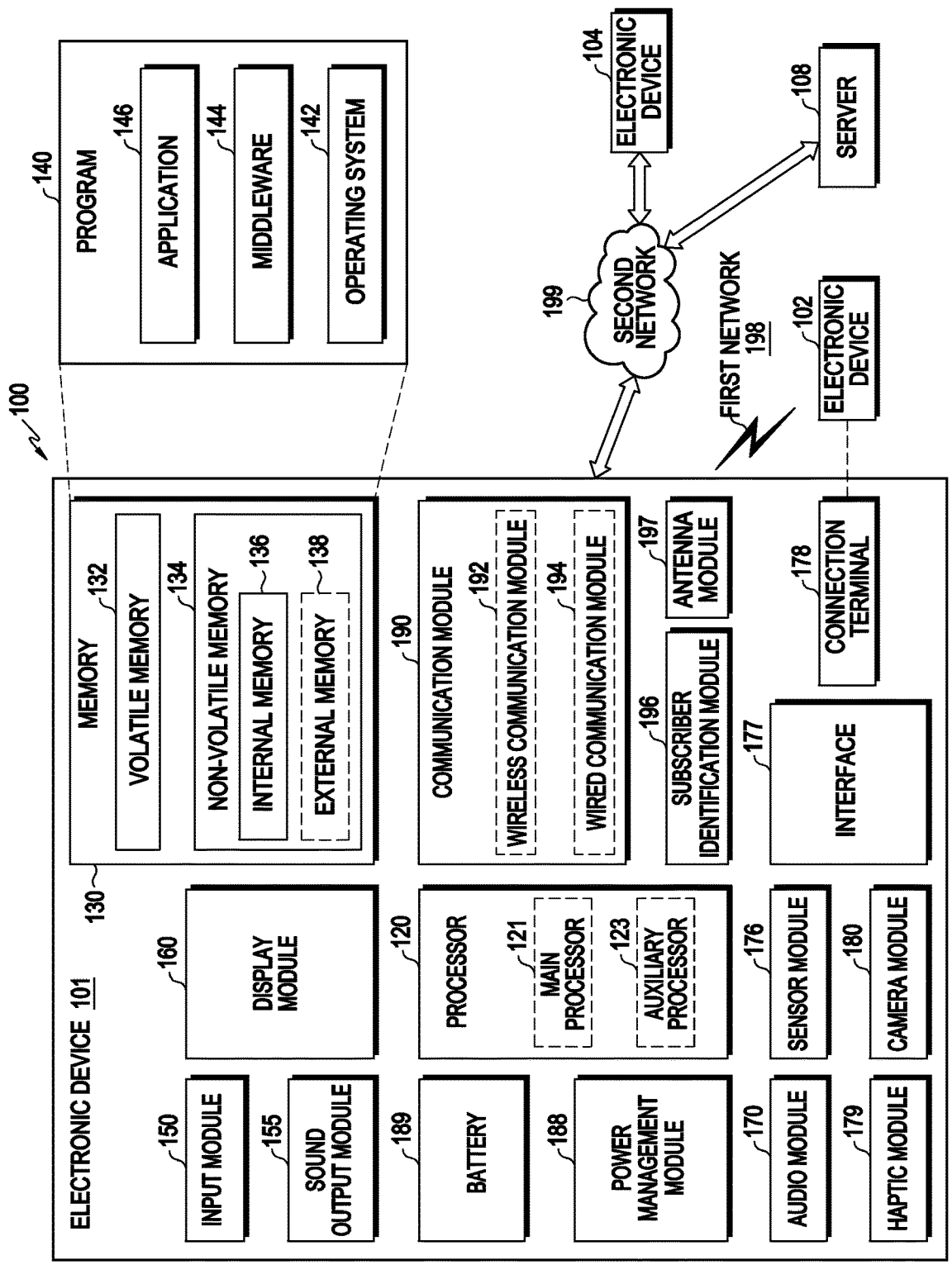
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include at least one of internal memory 136 or external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a $5^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
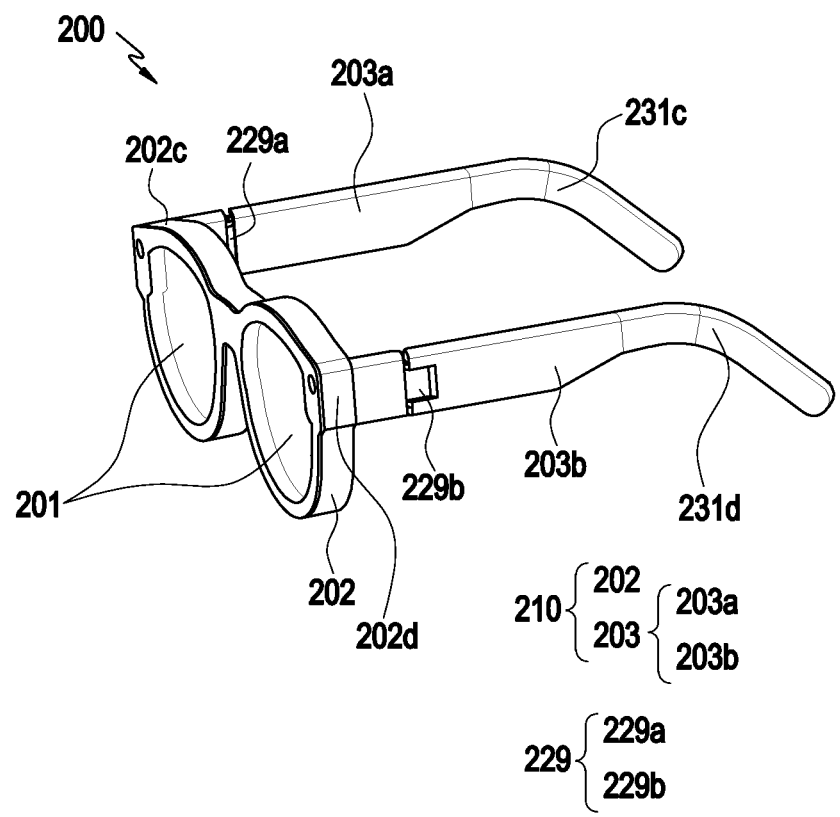
FIG. 2 is a perspective view illustrating an electronic device according to an embodiment of the disclosure.

FIG. 2 is a perspective view illustrating an electronic device according to an embodiment of the disclosure.

Referring to FIG. 2, the electronic device 200 is a glasses-type wearable electronic device, and a user may visually recognize a surrounding object or environment in the state of wearing the electronic device 200. For example, the electronic device 200 may be a head mounted device (HMD) or smart glasses capable of providing an image directly in front of the user's eyes. The configuration of the electronic device 200 of FIG. 2 may be wholly or partly the same as that of the electronic device 101 of FIG. 1.

According to various embodiments, the electronic device 200 may include a housing 210 that defines an external appearance of the electronic device 200. The housing 210 may provide a space in which components of the electronic device 200 may be disposed. For example, the housing 210 may include a lens frame 202 and at least one wearing member 203.

According to various embodiments, the electronic device 200 may include at least one display member 201 capable of providing visual information to the user. For example, the display member 201 may include a module equipped with a lens, a display, a waveguide, and/or a touch circuit. According to an embodiment, the display member 201 may be transparent or translucent. According to an embodiment, the display member 201 may include a translucent glass or a window member capable of adjusting the transmittance of light by adjusting the color concentration thereof. According to an embodiment, a pair of display members 201 may be provided and may be disposed to correspond to the left eye and the right eye of the user, respectively, in the state in which the electronic device 200 is worn on the user's body.

According to various embodiments, the lens frame 202 may at least partially accommodate the display members 201. For example, the lens frame 202 may at least partially surround the edges of the display members 201. According to an embodiment, the lens frame 202 may position at least one of the display members 201 to correspond to the user's eyes. According to an embodiment, the lens frame 202 may be a rim having a general eyeglass structure. According to an embodiment, the lens frame 202 may include at least one closed curve surrounding the display member 201. According to an embodiment, the lens frame 202 may include a first end 202*c* and a second end 202*d* opposite to the first end 202*c*. The first end 202*c* may be disposed adjacent to a first wearing member 203*a*, and the second end 202*d* may be disposed adjacent to a second wearing member 203*b*.

According to various embodiments, the wearing member 203 may extend from the lens frame 202. For example, the wearing member 203 may extend from respective ends of the lens frame 202 and may be supported or located on the user's body (e.g., ears) together with the lens frame 202.

According to an embodiment, the wearing member 203 may be rotatably coupled to the lens frame 202 via hinge structure 229. According to an embodiment, the wearing member 203 may each include an inner surfaces 231c configured to face the user's body and an outer surface 231d opposite to the inner surface. According to an embodiment (not illustrated), the wearing member 203 may be at least partially formed of a flexible material (e.g., rubber). For example, at least a portion of each wearing member 203 may be formed in a band shape surrounding at least a part of the user's body (e.g., an ear).

According to various embodiments, the wearing member 203 may include a first wearing member 203a and a second wearing member 203b. According to an embodiment, the first wearing member 203a may be connected to the first end 202c of the lens frame 202, and the second wearing member 203b may be connected to the second end 202d of the lens frame 202.

According to various embodiments, the electronic device 200 may include hinge structure 229 configured to enable the wearing member 203 to be folded relative to the lens frame 202. The hinge structure 229 may be disposed between the lens frame 202 and the wearing member 203. In the state in which the electronic device 200 is not worn, the user may carry or store the electronic device 200 in the state in which the wearing member 203 are folded to partially overlap the lens frame 202. According to one embodiment, the hinge structure 229 may include a first hinge structure 229a connected to a portion (e.g., the first end 202c) of the lens frame 202 and the first wearing member 203a and a second hinge structure 229b connected to a portion (e.g., the second end 202d) of the lens frame 202 and the second wearing member 203b.

Figure 3:
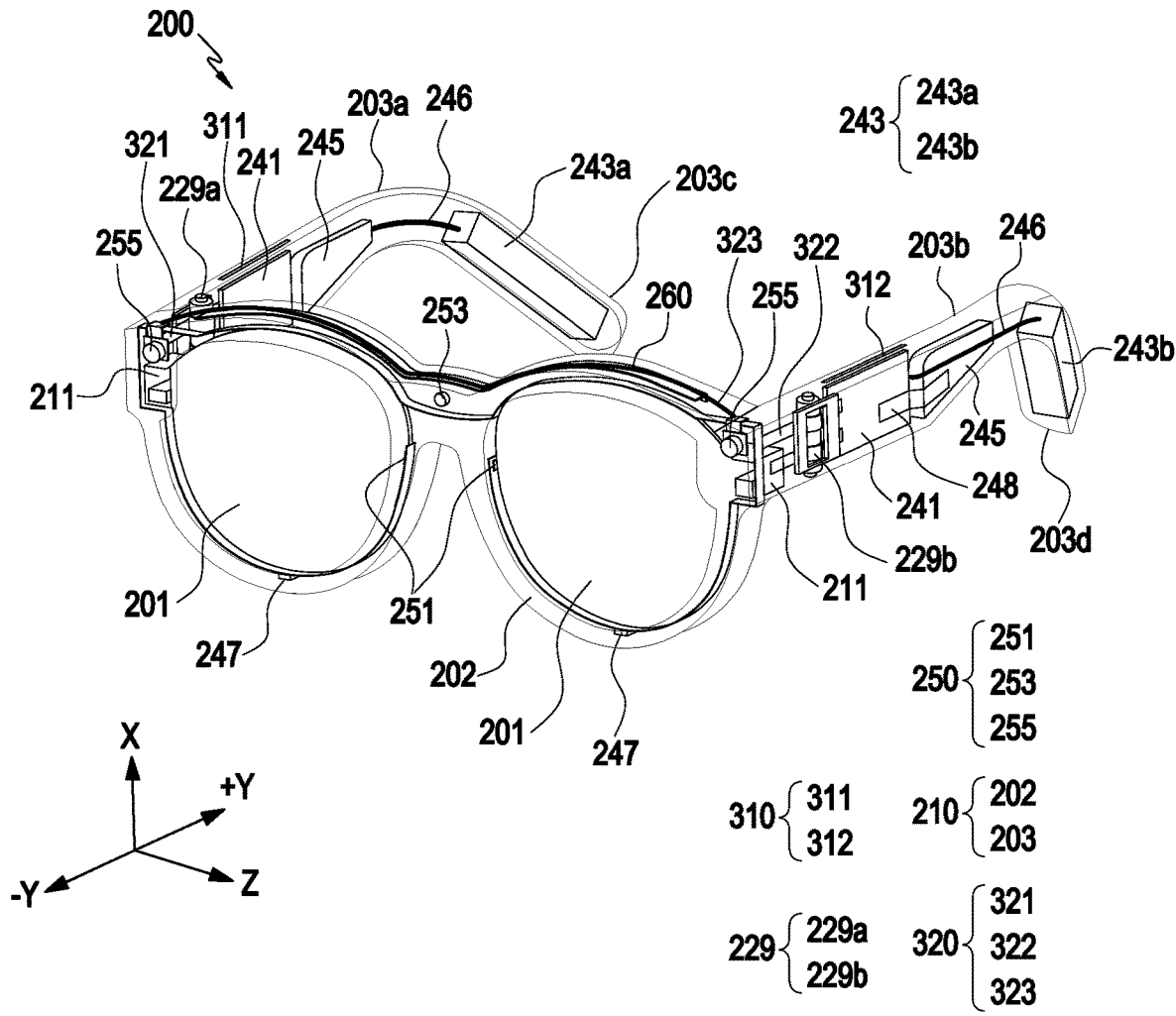
FIG. 3 is a perspective view provided for describing an internal configuration of an electronic device according to an embodiment of the disclosure.

FIG. 3 is a perspective view provided for describing an internal configuration of an electronic device according to an embodiment of the disclosure.

Figure 4:
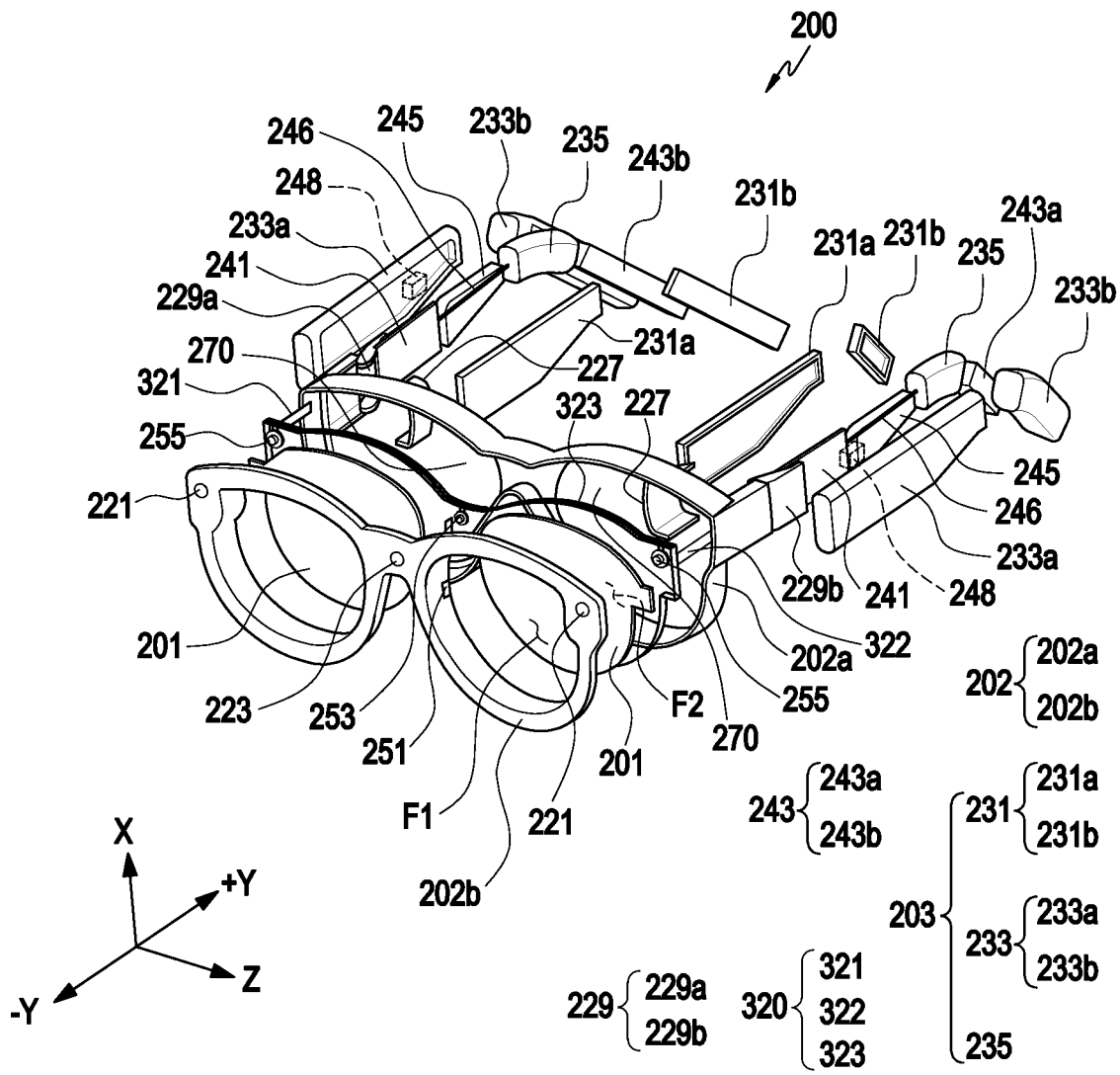
FIG. 4 is an exploded perspective view illustrating the electronic device according to an embodiment of the disclosure.

FIG. 4 is an exploded perspective view illustrating the electronic device according to an embodiment of the disclosure.

Referring to FIGS. 3 and 4, the electronic device 200 may include display members 201, a lens frame 202, wearing member 203, hinge structure 229, one or more circuit boards 241, one or more batteries 243, one or more power transmission structures 246, a camera module 250, antenna structure 310, and connecting member 320. The configurations of the display members 201, the lens frame 202, the wearing member 203, and the hinge structure 229 of FIGS. 3, 4, 5A, 5B, and/or 5C may wholly or partly the same as those of the display members 201, the lens frame 202, the wearing member 203, and the hinge structure 229 of FIG. 2.

According to various embodiments, the electronic device 200 may acquire and/or recognize visual images regarding an object or environment in a direction, in which the user gazes or the electronic device 200 is oriented (e.g., the −Y direction) by using the camera module 250 (e.g., the camera module 180 of FIG. 1) and may receive information about the object or environment from an external electronic device (e.g., the electronic devices 102 and 104 or the server 108 of FIG. 1) via a network (e.g., the first network 198 or the second network 199 of FIG. 1). In another embodiment, the electronic device 200 may provide, to the user, the received information about the object or environment in an acoustic or visual form. The electronic device 200 may provide, to the user, the received information about the object or environment via the display members 201 in a visual form by using a display module (e.g., the display module 160 of FIG. 1). For example, the electronic device 200 may implement augmented reality by implementing the information about the object or environment in a visual form and combining the information with an actual image of the environment around the user.

According to various embodiments, the display member 201 may include a first surface F1 oriented in a direction (e.g., in the −Y direction) in which external light is incident and a second surface F2 facing away from the first surface F1 (e.g., in the +Y direction). In the state in which the user wears the electronic device 200, at least a part of the light or image incident through the first surface F1 may pass through the second surfaces F2 of the display members 201, which are disposed to face the user's left eye and/or right eye to be incident to the user's left eye and/or right eye.

According to various embodiments, the lens frame 202 may include at least two frames. For example, the lens frame 202 may include a first frame 202a and a second frame 202b. According to an embodiment, when the user wears the electronic device 200, the first frame 202a may be a frame of a portion facing the user's face, and the second frame 202b may be a portion of the lens frame 202 spaced apart from the first frame 202a in the user's gazing direction (e.g., the −Y direction).

According to various embodiments, the electronic device 200 may include light output modules 211 configured to provide an image and/or a video to a user. For example, the light output modules 211 may include display panels (not illustrated) capable of outputting an image, and lenses (not illustrated) corresponding to the user's eyes and configured to guide the image to the display members 201. For example, the user may acquire an image output from the display panels of the light output modules 211 through the lenses of the light output modules 211. According to various embodiments, the light output modules 211 may each include a device configured to display various pieces of information. For example, the light output modules 211 may each include at least one of a liquid crystal display (LCD), a digital mirror device (DMD), a liquid crystal-on-silicon (LCoS) display device, an organic light-emitting diode, an organic light-emitting diode (OLED), or a micro light emitting diode (a micro-LED). According to an embodiment, when the light output modules 211 and/or the display members 201 each include one of a liquid crystal display device, a digital mirror display device, or a liquid crystal-on-silicon (LCoS) display device, the electronic device 200 may include light sources configured to emit light to the display areas of the light output modules 211 and/or the display members 201. According to another embodiment, when the light output modules 211 and/or the display members 201 each include one of an organic light emitting diode or a micro-LED, the electronic device 200 may provide a virtual image to the user without including a separate light source.

According to various embodiments, each light output module 211 may be at least partially disposed within the housing 210. For example, the light output modules 211 may be disposed on the wearing member 203 or the lens frame 202 to correspond to the user's right eye and left eye, respectively. According to an embodiment, the light output modules 211 may be connected to the display members 201, respectively, and may provide an image to the user via the display members 201. For example, an image output from the light output modules 211 is incident on the display members 201 via input optical members located at one ends of the display members 201, and may be emitted to the user's eyes through waveguides and output optical members each located in at least portions of the display members 201. According to an embodiment, the waveguides may be made of glass, plastic, or polymer, and may each include a nano-pattern, such as a grating structure of a polygonal or curved shape, provided on one inner or outer surface. According to an embodiment, the waveguides may each include at least one of at least one diffractive element (e.g., a diffractive optical element (DOE), a holographic optical element (HOE)), or a reflective element (e.g., a reflective mirror).

According to various embodiments, the electronic device 200 may include circuit boards 241 each of which accommodates components for driving the electronic device 200 (e.g., a printed circuit board (PCB), a printed board assembly (PBA), an FPCB (flexible PCB), or a rigid-flexible PCB (RFPCB). For example, the circuit boards 241 may each include at least one integrated circuit chip, and at least one of the processor 120, the memory 130, the power management module 188, or the communication module 190 of FIG. 1 may be provided in the integrated circuit chip. According to an embodiment, the circuit boards 241 may be disposed in the wearing member 203 of the housing 210, respectively. For example, the circuit boards 241 may include a first circuit board 241a disposed in the first wearing member 203a and a second circuit board 241b disposed in the second wearing member 203b. According to an embodiment, the communication module 190 may be located in the wearing member 203a or 203b different from the wearing member in which the processor 120 is located. For example, the communication module 190 may be mounted on the first circuit board 241a located within the first wearing member 203a, and the processor 120 may be mounted on the second circuit board 241b located within the second wearing member 203b. According to an embodiment, the circuit boards 241 may be electrically connected to the batteries 243 via power transmission structures 246, respectively. According to an embodiment, the circuit boards 241 may be interposer boards.

According to various embodiments, the batteries 243 (e.g., the battery 189 in FIG. 1) may be electrically connected to the components (e.g., the light output modules 211, the circuit boards 241, the speaker modules 245, the microphone modules 247, and/or the camera modules 250) of the electronic device 200, and may supply power to the components of the electronic device 200.

According to various embodiments, the batteries 243 may be at least partially disposed within the wearing member 203, respectively. According to an embodiment, the batteries 243 may include a first battery 243a disposed in the first wearing member 203a and a second battery 243b disposed in the second wearing member 203b. According to an embodiment, the batteries 243 may be disposed adjacent to the ends 203c and 203d of the wearing member 203, respectively.

According to various embodiments, the speaker modules 245 (e.g., the audio module 170 or the sound output module 155 in FIG. 1) may convert an electrical signal into sound. The speaker modules 245 may be at least partially disposed within the wearing member 203 of the housing 210. According to an embodiment, the speaker modules 245 may be located in the wearing member 203 to correspond to the user's ears, respectively. According to an embodiment (e.g., FIG. 3), the speaker modules 245 may be disposed next to the circuit boards 241, respectively. For example, the speaker modules 245 may be disposed between the circuit boards 241 and the batteries 243, respectively. According to an embodiment (not illustrated), the speaker modules 245 may be disposed on the circuit boards 241, respectively. For example, the speaker modules 245 may be disposed between the circuit boards 241 and the inner cases (e.g., the inner cases 231 in FIG. 4), respectively. According to an embodiment, the speaker module 245 may be electrically connected to a circuit board 241 via flexible circuit board 248.

According to various embodiments, the electronic device 200 may include power transmission structures 246 configured to transmit power of the batteries 243 to electronic components (e.g., the light output modules 211) of the electronic device 200. For example, the power transmission structures 246 may be electrically connected to the batteries 243 and/or the circuit boards 241, and the circuit boards 241 may transmit, to the light output modules 211, respectively, power received via the power transmission structures 246. According to an embodiment, the power transmission structures 246 may have configurations capable of transmitting power. For example, the power transmission structures 246 may each include a flexible printed circuit board or a wire. For example, the wire may include a plurality of cables (not illustrated). In various embodiments, the shape of the power transmission structures 246 may be variously modified in consideration of the number and/or type of cables, or the like.

According to various embodiments, microphone modules 247 (e.g., the input module 150 and/or the audio module 170 in FIG. 1) may convert sound into an electrical signal. According to an embodiment, the microphone modules 247 may be disposed within the lens frame 202. For example, one or more microphone modules 247 may be disposed at the lower end (e.g., in the −X-axis direction) and/or the upper end (e.g., the X-axis direction) of the electronic device 200. According to various embodiments, the electronic device 200 may more clearly recognize the user's voice by using voice information (e.g., sound) acquired from the one or more microphone modules 247. For example, based on the acquired voice information and/or additional information (e.g., low-frequency vibration of the user's skin and bone), the electronic device 200 may distinguish voice information and ambient noise from each other. For example, the electronic device 200 may clearly recognize the user's voice and may perform a function of reducing ambient noise (e.g., noise canceling).

According to various embodiments, the camera modules 250 may capture a still image and/or a video image. The camera modules 250 may each include at least one of a lens, at least one image sensor, an image signal processor, or a flash. According to an embodiment, the camera modules 250 may be disposed in the lens frame 202 and disposed around the display member 201.

According to various embodiments, the camera modules 250 may include one or more first camera modules 251. According to an embodiment, the first camera modules 251 may image the trajectory of the user's eyes (e.g., pupils) or gaze. For example, the first camera modules 251 may each include a light-emitting unit (e.g., an IR LED) (not illustrated) configured to emit light in an infrared band, and a camera structure (not illustrated) configured to image a reflection pattern of the light emitted by the light emitting unit to the user's eyes. According to an embodiment, in order to make a virtual image projected to the display members 201 correspond to the direction at which the user's pupils gaze, the processor (e.g., the processor 120 in FIG. 1) may adjust the position of the virtual image. According to an embodiment, the electronic device 200 may track the trajectory of the user's eyes or gaze by using the plurality of first camera modules 251 having the same standard and performance.

According to various embodiments, the first camera modules 251 may periodically or aperiodically transmit information related to the trajectory of the user's eyes or gaze (e.g., trajectory information) to the processor (e.g., the processor 120 in FIG. 1). According to another embodiment, the first camera modules 251 may transmit the trajectory information to the processor when detecting that the user's gaze has changed based on the trajectory information (e.g., when the eyes have moved more than a reference value in the state in which the head does not move).

According to various embodiments, the camera modules 250 may include a second camera module 253. According to an embodiment, the second camera modules 253 may capture an external image. According to an embodiment, the second camera module 253 may capture an external image through a second optical hole 223 provided in the second frame 202b. For example, the second camera module 253 may include a high-resolution color camera, and may be a high resolution (HR) or photo video (PV) camera. According to an embodiment, the second camera module 253 may provide an auto focus (AF) function and an optical image stabilizer (OIS) function.

According to various embodiments (not illustrated), the electronic device 200 may include a flash (not illustrated) located adjacent to the second camera module 253. For example, the flash (not illustrated) may provide light for increasing the brightness (e.g., illuminance) around the electronic device 200 when acquiring an external image of the second camera module 253, and may reduce difficulty of acquiring an image due to a dark environment, mixing of various light sources, and/or reflection of light.

According to various embodiments, the camera modules 250 may include one or more third camera modules 255. According to an embodiment, the third camera modules 255 may image a user's motion through the first optical holes 221 provided in the lens frame 202. For example, the third camera modules 255 may image the user's gesture (e.g., a hand gesture). The third camera modules 255 and/or first optical holes 221 may be disposed respective at the opposite ends of the lens frame 202 (e.g., the second frame 202b) (e.g., the opposite ends of the lens frame 202 (e.g., the second frame 202b) in the X direction). According to an embodiment, the third camera modules 255 may be global shutter (GS) type cameras. For example, the third camera modules 255 may provide 360-degree spatial (e.g., omnidirectional) or positional recognition and/or movement recognition using cameras that support 3 degrees of freedom (DoF) or 6 DoF. According to an embodiment, the third camera modules 255 may perform a movement path tracking function (simultaneous localization and mapping (SLAM)) and a user movement recognition function using a plurality of global shutter type cameras of the same standard and performance as stereo cameras. According to an embodiment, the third camera modules 255 may each include an infrared (IR) camera (e.g., a time of flight (ToF) camera or a structured light camera). For example, the IR camera may be operated as at least a portion of a sensor module (e.g., the sensor module 176 in FIG. 1) for detecting a distance to a subject.

According to an embodiment, at least one of the first camera modules 251 and the third camera modules 255 may be replaced with a sensor module (e.g., the sensor module 176 in FIG. 1). For example, the sensor module may include at least one of a vertical cavity surface emitting laser (VCSEL), an infrared sensor, and/or a photodiode. For example, the photodiode may include a positive intrinsic negative (PIN) photodiode or an avalanche photodiode (APD). The photodiode may be interpreted as a photo detector or a photo sensor.

According to an embodiment, at least one of the first camera modules 251, the second camera module 253, or the third camera modules 255 may include a plurality of camera modules (not illustrated). For example, the second camera module 253 may include a plurality of lenses (e.g., wide-angle and telephoto lenses) and image sensors and may be disposed on one surface (e.g., the surface oriented in the −Y-axis direction) of the electronic device 200. For example, the electronic device 200 may include a plurality of camera modules having different attributes (e.g., angles of view) or functions, respectively, and may control the camera modules to change the angles of view thereof based on the user's selection and/or trajectory information. For example, at least one of the plurality of camera modules may be a wide-angle camera, and at least another one of the camera modules may be a telephoto camera.

According to various embodiments, the processor (e.g., the processor 120 in FIG. 1) may determine the movement of the electronic device 200 and/or the user's movement using the information of the electronic device 200 acquired by using at least one of the gesture sensor, the gyro sensor, or the acceleration sensor of the sensor module (e.g., the sensor module 176 in FIG. 1) and the user's movement (e.g., the approach of the user's body to the electronic device 200) acquired by using the third camera modules 255. According to an embodiment, in addition to the above-described sensors, the electronic device 200 may include a magnetic (geomagnetic) sensor capable of measuring an azimuth using a magnetic field and a line of magnetic force and/or a Hall sensor capable of acquiring movement information (e.g., a movement direction or a movement distance) using the intensity of the magnetic field. For example, the processor may determine the movement of the electronic device 200 and/or the movement of the user based on information acquired from a magnetic (geomagnetic) sensor and/or a Hall sensor.

According to various embodiments (not illustrated), the electronic device 200 may perform an input function (e.g., a touch and/or a pressure detection function) capable of interacting with the user. For example, components configured to perform a touch and/or a pressure detection function (e.g., a touch sensor and/or a pressure sensor) may be disposed on at least a portion of the wearing member 203. The electronic device 200 may control a virtual image output through the display members 201 based on the information acquired via the components. For example, the sensors related to a touch detection function and/or a pressure detection function may be configured in various types, such as a resistive type, a capacitive type, an electromagnetic type (EM), or an optical type. According to an embodiment, all or some of the components configured to perform a touch detection function and/or a pressure detection function may be the same as those of the input module 150 of FIG. 1.

According to various embodiments, the electronic device 200 may include a reinforcing member 260 disposed in the internal space of the lens frame 202 and configured to have a higher rigidity than that of the lens frame 202.

According to various embodiments, the electronic device 200 may include lens structures 270. The lens structures 270 may refract at least a part of light. For example, the lens structures 270 may be prescription lenses having a specified refractive power. According to an embodiment, the lens structures 270 may be disposed behind the window member of the display members 201 (e.g., in the +Y direction). For example, the lens structures 270 may be located between the display members 201 and the user's eyes.

According to various embodiments, the housing 210 may include hinge covers 227 capable of concealing portions of the hinge structure 229. The other portions of the hinge structure 229 may be accommodated or concealed between inner cases 231 and outer cases 233, which will be described later.

According to various embodiments, the wearing member 203 may each include an inner case 231 and an outer case 233. The inner cases 231 are, for example, cases configured to face the user's body or to come into direct contact with the user's body, and may be made of a material having a low thermal conductivity (e.g., a synthetic resin). According to an embodiment, the inner case 231 may include an inner surface (e.g., the inner surface 231c in FIG. 2) facing the user's body. The outer cases 233 may include, for example, a material (e.g., a metal material) capable of at least partially transferring heat, and may be coupled to face the inner cases 231, respectively. According to an embodiment, the outer case 233 may include an outer surface (e.g., the outer surface 231d in FIG. 2) opposite to the inner surface 231c. In an embodiment, at least one of the circuit boards 241 or the speaker modules 245 may be accommodated in a space separated from the battery 243 within the wearing member 203. In the illustrated embodiment, the inner cases 231 may include a first case 231a including a circuit board 241 and/or a speaker module 245 and a second case 231b configured to accommodate a battery 243, and the outer cases 233 may include a third case 233a coupled to face the first case 231a and a fourth case 233b coupled to face the second case 231b. For example, the first case 231a and the third case 233a (hereinafter, "first case parts 231a and 233 a") may be coupled to accommodate the circuit board 241 and/or the speaker module 245, and the second case 231b and the fourth case 233b (hereinafter, "second case parts 231b and 233b") may be coupled to accommodate the battery 243.

According to various embodiments, the first case parts 231a and 233a may be rotatably coupled to the lens frame 202 via the hinge structure 229, and the second case parts 231b and 233b may be connected to or mounted on the ends of the first case parts 231a and 233a via the connecting structures 235. In some embodiments, the portions of the connecting structures 235 that come into contact with the user's body may be made of a material having low thermal conductivity (e.g., an elastic material such as silicone, polyurethane, or rubber), and the portions that do not come into contact with the user's body may be made of a material having a high thermal conductivity (e.g., a metal material). For example, when heat is generated from the circuit boards 241 or the batteries 243, the connecting structures 235 block heat from being transferred to portions that come into contact with the user's body, and may distribute or release heat through the portions that do not come into contact with the user's body. According to an embodiment, the portions of the connecting structures 235 that are configured to come into contact with the user's body may be interpreted as portions of the inner cases 231, and the portions of the connecting structures 235 that do not come into contact with the user's body may be interpreted as portions of the outer cases 233. According to an embodiment (not illustrated), the first case 231a and the second case 231b may be integrally configured without the connecting structure 235, and the third case 233a and the fourth case 233b may be integrally configured to each other without the connecting structure 235. According to various embodiments, in addition to the illustrated components, other components (e.g., the antenna module 197 of FIG. 1) may be further included, and information about an object or environment may be provided from an external electronic device (e.g., the electronic device 102 or 104 or the server 108 in FIG. 1) using a communication module 190 via a network (e.g., the first network 198 or the second network 199 in FIG. 1).

According to various embodiments, the electronic device 200 may include antenna structure 310 (e.g., the antenna module 197 of FIG. 1). According to an embodiment, the antenna structure 310 may include a first antenna structure 311 disposed within the first wearing member 203a and a second antenna structure 312 disposed within the second wearing member 203b. According to an embodiment, the antenna structure 310 may be antennas for communication with an external electronic device (e.g., the electronic device 102 of FIG. 1) by using a first network (e.g., the first network 198 of FIG. 1) (e.g., a short-range communication network such as Bluetooth, wireless fidelity (WiFi) direct, or infrared data association (IrDA)). For example, the antenna structure 310 may be an antenna for Bluetooth and/or WiFi communication. According to an embodiment, the antenna structure 310 may be antennas for communicating with an electronic device (e.g., the electronic device 104 of FIG. 1) and/or a server (e.g., the server 108 of FIG. 1) by using a second network (e.g., the second network 199 of FIG. 1) (e.g., a telecommunication network such as a legacy cellular network, a 5G network, a next-generation communication network, the Internet, or a computer network (e.g., a LAN or a WAN). For example, the antenna structure 310 may be antennas for 5G communication.

According to various embodiments, the electronic device 200 may include connecting member 320. According to an embodiment, the circuit boards 241 may be connected to the connecting member 320, respectively, and may transmit electrical signals to the electronic components (e.g., the light output modules 211 and/or the camera modules 250) of the electronic device 200 via the connecting member 320. For example, a control signal transmitted from a processor (e.g., the processor 120 of FIG. 1) located on the circuit board 241 may be transmitted to electronic components by using at least some of the connecting member 320. For example, at least some of the connecting member 320 (e.g., the first connecting member 321 and/or the second connecting member 322) may include wires (not illustrated) electrically connected to components of the electronic device 200.

According to an embodiment, a communication module (e.g., the communication module 190 of FIG. 1) may be electrically connected to the second antenna structure 312 using the connecting member 320. According to various embodiments, the connecting member 320 may include a first connecting member 321 at least partially disposed within the first wearing member 203a and a second connecting member 322 at least partially disposed within the second wearing member 203b. According to an embodiment, the first connecting member 321 and/or the second connecting member 322 may at least partially face the hinge structure 229. For example, the first connecting member 321 may extend from the first circuit board 241a to the inside of the lens frame 202 across the first hinge structure 229a. The second connecting member 322 may extend from the second circuit board 241b into the lens frame 202 across the second hinge structure 229b. For example, a portion of the first connecting member 321 and a portion of the second connecting member 322 may be disposed within the wearing member 203, and the other portions may be disposed within the lens frame 202.

According to an embodiment, the first connecting member 321 and the second connecting member 322 may include structures that are foldable or unfoldable based on the rotation of the hinge structure 229, respectively. For example, the first connecting member 321 and the second connecting member 322 may each include a flexible printed circuit board. According to an embodiment, one end of the first connecting member 321 may be electrically and/or mechanically connected to the first circuit board 241*a*, and the other end of the first connecting member 321 may be electrically and/or mechanically connected to one end of the third connecting member 323. One end of the second connecting member 322 may be electrically and/or mechanically connected to the second circuit board 241*a*, and the other end of the second connecting member 322 may be electrically and/or mechanically connected to the other end of the third connecting member 323.

According to various embodiments, the connecting member 320 may include a third connecting member 323 at least partially disposed within the lens frame 202. According to an embodiment, the third connecting member 323 may be electrically connected to the first connecting member 321 and the second connecting member 322. For example, the electronic device 200 may include a first connecting area (e.g., a connector or a pad) (not illustrated) located between one end of the first connecting member 321 and one end of the third connecting member 323 and a second connecting area (e.g., a connector or a pad) (not illustrated) located between one end of the second connecting member 322 and the other end of the third connecting member 323. According to an embodiment, a radio frequency wire located inside the first connecting member 321 may be connected to one end of the third connecting member 323 via the first connecting area. A radio frequency wire located inside the second connecting member 322 may be connected to the other end of the third connecting member 323 via the second connecting area. According to an embodiment, the third connecting member 323 may include a first connecting area (not illustrated) to be connected to the first connecting member 321 and a second connecting area (not illustrated) to be connected to the second connecting member 322. According to an embodiment, the first connecting area and the second connecting area may be receptacles. According to an embodiment, the first connecting area and the second connecting area may be pads for solder connection.

According to an embodiment, the third connecting member 323 may surround at least a portion of the display member 201. For example, at least some of the connecting member 320 (e.g., the third connecting member 323) may be disposed on at least a portion of the circumference of the display member 201 inside the lens frame 202. According to an embodiment, the configuration of the third connecting member 323 may be different from that of the first connecting member 321 and/or the second connecting member 322. For example, the third connecting member 323 may include a cable structure (e.g., a coaxial cable). According to an embodiment, a loss of a signal passing through the third connecting member 323 (e.g., radio frequency (RF) loss) may be less than a loss of a signal passing through the first connecting member 321 and/or the second connecting member 322. For example, the third connecting member 323 may include a radio signal wire and a shielding structure (not illustrated) to surround the radio signal wire and to shield a loss of a signal passing through the radio signal wire. According to another embodiment, the third connecting member 323 may include a flexible printed circuit board and/or an optical cable.

According to an embodiment, the first connecting member 321, the second connecting member 322, and/or the third connecting member 323 may include structures (e.g., wires and/or cables) for transmitting signals. According to an embodiment, the first connecting member 321 may be interpreted as a first signal transmission member, the second connecting member 322 may be interpreted as a second signal transmission member, and the third connecting member 323 may be interpreted as a third signal transmission member.

According to an embodiment, the first thickness (not illustrated) of the first connecting member 321 and/or the second thickness (not illustrated) of the second connecting member 322 may be smaller than a third thickness (not illustrated) of the third connecting member 323. According to an embodiment, the flexibility of the first connecting member 321 and/or the flexibility of the second connecting member 322 may be greater than that of the third connecting member 323. According to an embodiment, a loss of a signal passing through the third connecting member 323 may be less than a loss of a signal passing through the first connecting member 321 and/or the second connecting member 322.

Figure 5A:
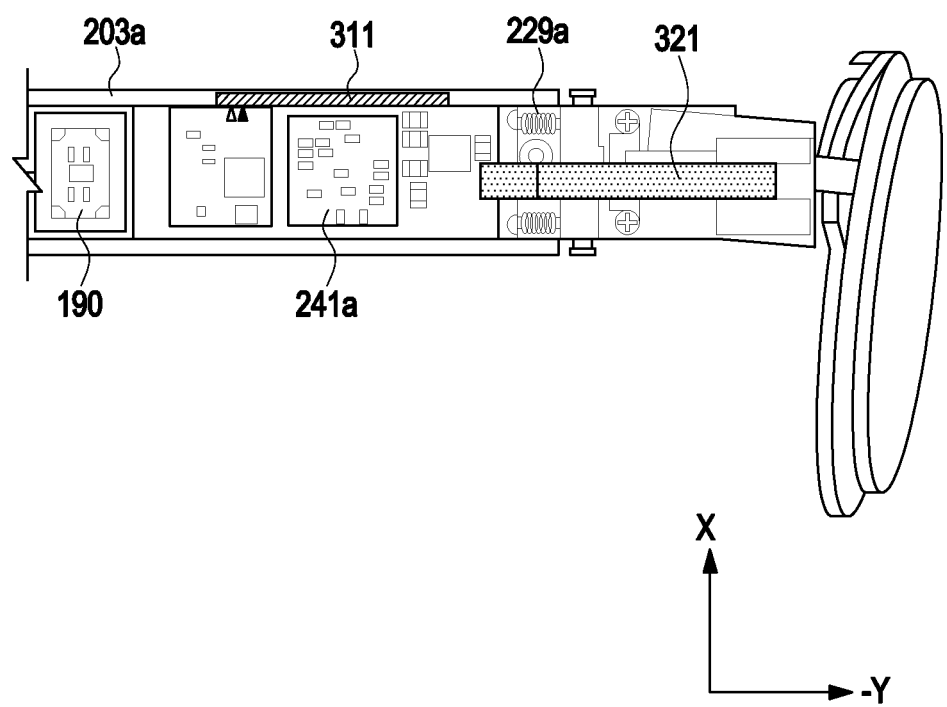
FIGS. 5A, 5B, and 5C are views provided for describing a connective relationship between connecting member and antenna structure according to various embodiments of the disclosure.
Figure 5B:
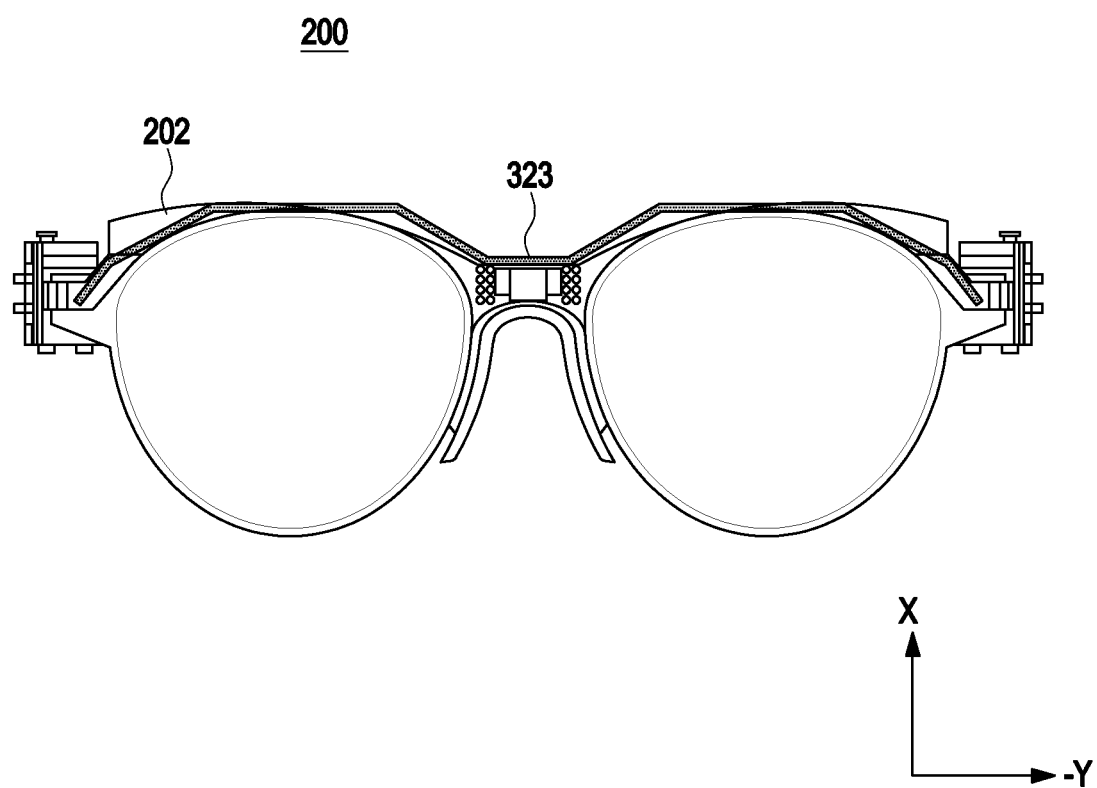
Figure 5C:
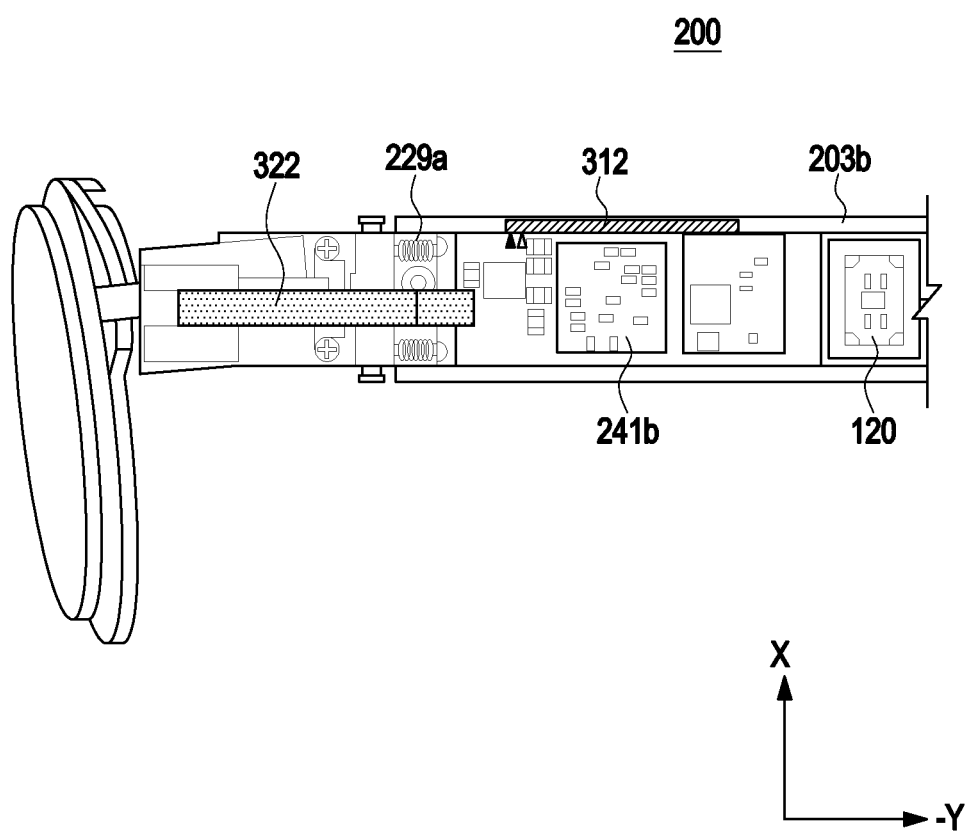

FIGS. 5A, 5B, and 5C are views provided for describing a connective relationship between connecting member and antenna structure according to various embodiments of the disclosure. For example, FIG. 5A is a projective view of the electronic device viewed from the right, FIG. 5B is a projective view of the electronic device viewed from the front, and FIG. 5C is a projective view of the electronic device viewed from the left.

Referring to FIGS. 5A to 5C, the electronic device 200 may include a processor 120, a communication module 190, a lens frame 202, wearing member 203*a* and 203*b*, circuit boards 241*a* and 241*b*, and antenna structure 311 and 312, and connecting member 321, 322, and 323. The configurations of the processor 120 and the communication module 190 of FIGS. 5A to 5C are wholly or partly the same as those of the processor 120 and the communication module 190 of FIG. 1, and the configurations of the lens frame 202, the wearing member 203*a* and 203*b*, the circuit boards 241*a* and 241*b*, the antenna structure 311 and 312, and the connecting member 321, 322, and 323 of FIGS. 5A to 5C are wholly or partly the same as those of the lens frame 202, the wearing member 203, the circuit boards 241, the antenna structure 310, and the connecting member 320 of FIGS. 3 and 4.

According to various embodiments, the communication module 190 may be electrically connected to the first antenna structure 311 and/or the second antenna structure 312. According to an embodiment, the electronic device 200 may include a first wiring structure (not illustrated) connected to the communication module 190 and the first antenna structure 311. The communication module 190 may be electrically connected to the first antenna structure 311 via the first wiring structure. For example, the communication module 190 located within the first wearing member 203*a* may be electrically connected to the first antenna structure 311 located within the first wearing member 203*a* without using the connecting member 321, 322, and 323. According to an embodiment, the communication module 190 may include a second wiring structure (not illustrated) electrically connected to at least some of the connecting member 321, 322, and 323 (e.g., the first connecting member 321). The communication module 190 may electrically connected to the second antenna structure 312 disposed within the second wearing member 203*b* via the second wiring structure, the first connecting member 321, the third connecting member 323, and the second connecting member 322. For example, a signal received by the second antenna structure 312 may be transmitted to the communication module 190 disposed within the first wearing member 203a via the second connecting member 322, the third connecting member 323, the first connecting member 321, and the second wiring structure.

According to various embodiments, the communication module 190 may be disposed within the wearing member 203a or 203b that is the same as or different from the wearing member within which the processor 120 is disposed. For example (e.g., FIGS. 5A and 5C), the communication module 190 may be disposed in the first wearing member 203a. According to an embodiment, the communication module 190 may be mounted on the first circuit board 241a. The processor 120 may be disposed within the second wearing member 203b. As another example (not illustrated), the communication module 190 may be disposed within the second wearing member 203b, and the processor 120 may be disposed within the first wearing member 203a.

Figure 6:
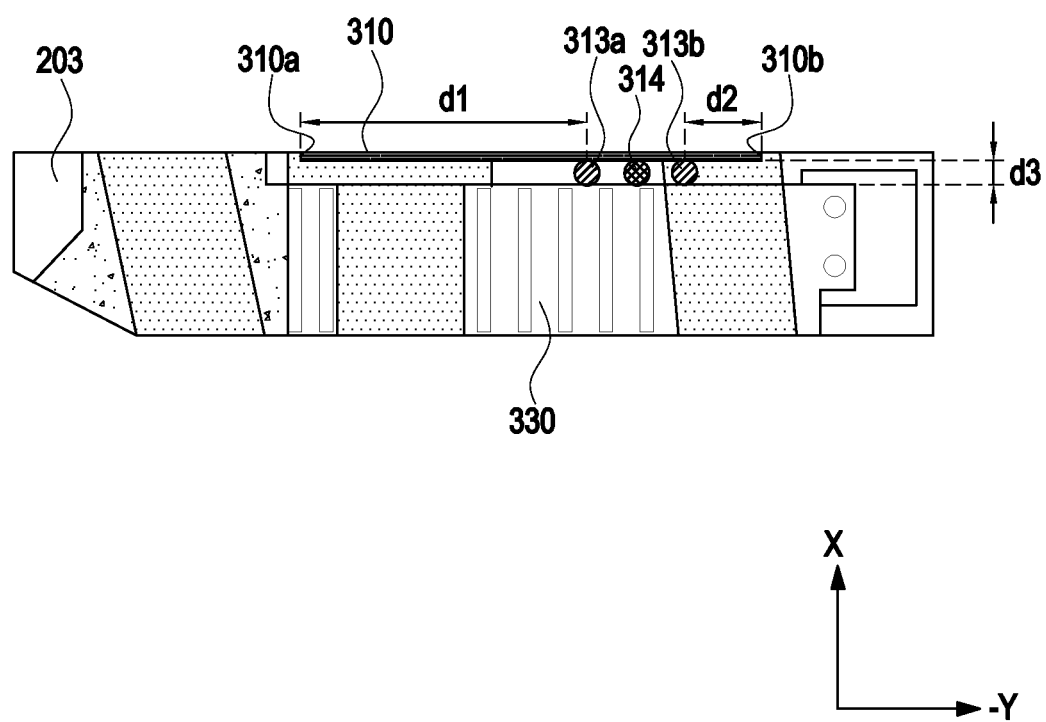
FIG. 6 is a view illustrating the inside of a wearing member including an antenna structure and a heat dissipation structure, according to an embodiment of the disclosure.

FIG. 6 is a view illustrating the inside of a wearing member including an antenna structure and a heat dissipation structure, according to an embodiment of the disclosure.

Referring to FIG. 6, the electronic device 200 may include a wearing member 203 and an antenna structure 310 disposed in the wearing member 203. The configurations of the electronic device 200, the wearing member 203, and the antenna structure 310 of FIG. 6 may be wholly or partly the same as those of the electronic device 200, the wearing member 203, and the antenna structure 310 of FIG. 3.

According to various embodiments, the antenna structure 310 may include ground areas 313a and 313b. According to an embodiment, the frequency band in which the antenna structure 310 operates may be determined based on a distance between the ground areas 313a and 313b and the end areas 310a and 310b of the antenna structure 310. According to an embodiment, the length (e.g., the first length d1) between at least a portion of antenna structure 310 (e.g., the first end area 310a) and the first ground area 313a may be about 20 mm, and at least a portion of the antenna structure 310 may transmit and/or receive a signal of a frequency of about 2.4 GHz band. According to an embodiment, the length (e.g., the second length d2) between at least a portion of antenna structure 310 (e.g., the second end area 310b) and the second ground area 313b may be about 7.5 mm, and at least a portion of the antenna structure 310 may transmit and/or receive a signal of a frequency of about 5.0 GHz band.

According to various embodiments, the antenna structure 310 may include a feeding area 314 configured to receive power. According to an embodiment, the feeding area 314 may be located between the first ground area 313a and the second ground area 313b.

According to various embodiments, the number of ground areas of the antenna structure 310 and the lengths between the ground areas and the feeding area may vary depending on a communication frequency region supported by the electronic device 200.

According to various embodiments, the electronic device 200 may include a heat dissipation structure 330. According to an embodiment, the heat dissipation structure 330 may dissipate heat generated by a component of the electronic device 200 (e.g., the communication module 190 of FIG. 5A and/or the processor 120 of FIG. 5C). According to an embodiment, the heat dissipation structure 330 may be a heat pipe. According to an embodiment, the heat dissipation structure 330 may be disposed within the wearing member 203 (e.g., the first wearing member 203a and/or the second wearing member 203b of FIG. 3).

According to various embodiments, the antenna structure 310 may face at least a portion of the heat dissipation structure 330. According to an embodiment, the antenna structure 310 may face the heat dissipation structure 330 in the state of being spaced apart from the heat dissipation structure 330. For example, the antenna structure 310 may be spaced apart from the heat dissipation structure 330 by a predetermined distance (e.g., the third distance d3). According to an embodiment, the first antenna structure 311 and the second antenna structure 312 may be disposed to be spaced apart from the heat dissipation structure 330. According to an embodiment, the third distance d3 may be about 1.5 mm. According to an embodiment, since the antenna structure 310 is spaced apart from the heat dissipation structure 330, heat transferred to the antenna structure 310 may be reduced, and a loss of a signal passing through the antenna structure 310 may be reduced. According to an embodiment, the antenna structure 310 may be disposed within the wearing member 203. According to an embodiment, the antenna structure 310 may be disposed to face the outside of the electronic device 200. For example, at least a portion of the antenna structure 310 may be surrounded by the outer case 233 of the wearing member 203. According to an embodiment, the antenna structure 310 may be disposed to be closer to the outer case (e.g., the outer case 233 of FIG. 4) than the inner case (e.g., the inner case 231 of FIG. 4).

Figure 7A:
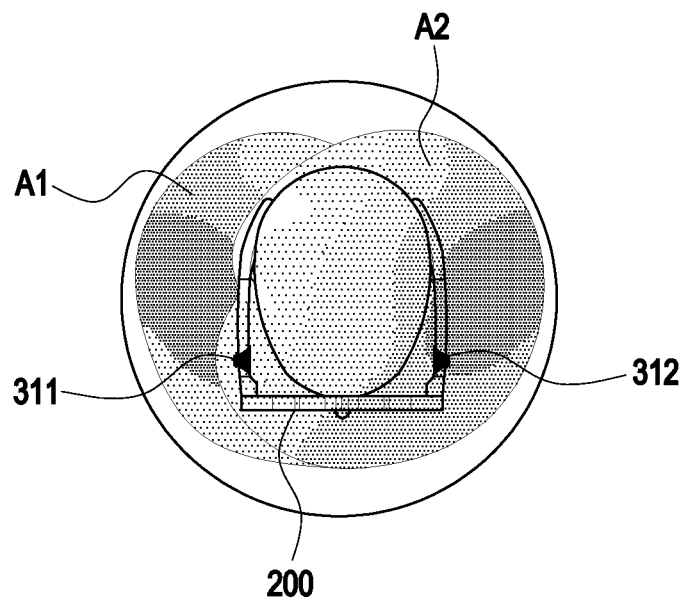
FIGS. 7A and 7B are views provided for describing an antenna coverage according to various embodiments of the disclosure.
Figure 7B:
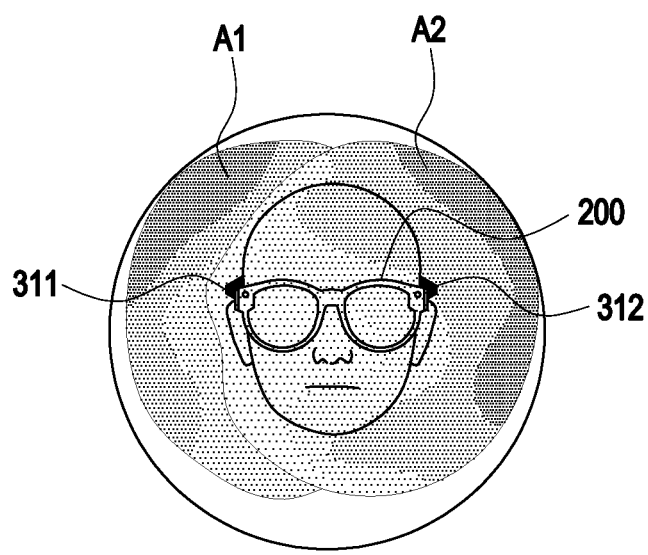

FIGS. 7A and 7B are views provided for describing an antenna coverage according to various embodiments of the disclosure.

Referring to FIGS. 7A and 7B, the electronic device 200 may include a first antenna structure 311 and a second antenna structure 312. The configurations of the electronic device 200, the first antenna structure 311, and the second antenna structure 312 of FIGS. 7A and 7B may be wholly or partly the same as those of the electronic device 200, the first antenna structure 311, and the second antenna of FIG. 3.

According to various embodiments, the electronic device 200 may communicate with an external electronic device (e.g., the electronic device 102 or 104 of FIG. 1) via a plurality of antenna structure (e.g., the first antenna structure 311 and the second antenna structure 312). According to an embodiment, the first antenna structure 311 may be disposed within the first wearing member (e.g., first wearing member 203a of FIG. 2) (e.g., the right wearing member), and the second antenna structure 312 may be disposed within the second wearing member (e.g., the second wearing member 203b of FIG. 2) (e.g., the left wearing member). Since the first antenna structure 311 and the second antenna structure 312 are located in different directions with reference to the user's body (e.g., the head), the antenna coverage of the electronic device 200 may be greater than the antenna coverage of an electronic device (not illustrated) including antenna structure 311 and 312 disposed within one wearing member (e.g., the first wearing member 203a or the second wearing member 203b). For example, the overlapping area of the first antenna coverage area A1 provided by the first antenna structure 311 and the second antenna coverage area A2 provided by the second antenna structure 312 may be reduced as the first antenna structure 311 and the second antenna structure 312 are spaced apart from each other.

According to various embodiments, the electronic device 200 may perform beamforming using a plurality of antenna structures (e.g., the first antenna structure 311 and the second antenna structure 312) to achieve directional signal transmission or reception.

According to various embodiments, the electronic device 200 may determine the position of an external electronic device (e.g., the electronic device 102 or 104 of FIG. 1) via a plurality of antenna structures (e.g., the first antenna structure 311 and the second antenna structure 312). For example, the processor of the electronic device 200 (e.g., the processor 120 of FIG. 1) may determine the direction of an external electronic device 102 or 104 relative to the electronic device 200 by using signals received by the first antenna structure 311 and the second antenna structure 312 spaced apart from the first antenna structure 311.

According to various embodiments of the disclosure, an electronic device (e.g., the electronic device 200 of FIG. 2) may include a lens frame (e.g., the lens frame 202 of FIG. 2) configured to accommodate a display member (e.g., the display member 201 of FIG. 2) and including a first end (e.g., the first end 202*c* of FIG. 2) and a second end (e.g., the second end 202*d* of FIG. 2) opposite to the first end, wearing member (e.g., the wearing member 203 of FIG. 2) including a first wearing member (e.g., the first wearing member 203*a* of FIG. 2) connected to the first end and a second wearing member (e.g., the second wearing member 203*b* of FIG. 2) connected to the second end; antenna structure (e.g., the antenna structure 310 of FIG. 3) including a first antenna structure (e.g., the first antenna structure 311 of FIG. 3) disposed within the first wearing member and a second antenna structure (e.g., the second antenna structure 312 of FIG. 3) disposed within the second wearing member; connecting member (e.g., the connecting member 320 of FIG. 4) including a first connecting member (e.g., the first connecting member 321 of FIG. 4) at least partially disposed within the first wearing member, a second connecting member (e.g., the second connecting member 322 of FIG. 4) at least partially disposed within the second wearing member and electrically connected to the second antenna structure, and a third connecting member (e.g., the third connecting member 323 of FIG. 4) disposed within the lens frame and electrically connected to the first connecting member and the second connecting member; and a communication module (e.g., the communication module 190 in FIG. 5A) disposed within the first wearing member, electrically connected to the first antenna structure, and electrically connected to the second antenna structure via the connecting member.

According to various embodiments, the electronic device may further include hinge structure (e.g., the hinge structure 229 of FIG. 2) including a first hinge structure (e.g., the first hinge structure 229*a* of FIG. 2) connected to the lens frame and the first wearing member, and a second hinge structure (e.g., the second hinge structure 229*b* of FIG. 2) connected to the lens frame and the second wearing member.

According to various embodiments, the first connecting member may face at least a portion of the first hinge structure, and the second connecting member may face at least a portion of the second hinge structure.

According to various embodiments, the first connecting member and the second connecting member may include a flexible printed circuit board.

According to various embodiments, the third connecting member may include at least one of a cable structure, a flexible printed circuit board, or an optical cable.

According to various embodiments, the electronic device may further include a heat dissipation structure (e.g., the heat dissipation structure 330 of FIG. 6) disposed in each of the wearing member, and the first antenna structure and the second antenna structure are disposed to be spaced apart from the heat dissipation structures.

According to various embodiments, the antenna structure may each include a first feeding area spaced apart from a first end area by a first distance, and a second feeding area spaced apart from a second end area opposite to the first end area by a second distance, and a ground area disposed between the first feeding area and the second feeding area.

According to various embodiments, the antenna structure may each include a first ground area (e.g., the first ground area 313*a* of FIG. 6) spaced apart from a first end area (e.g., the first end area 310*a* of FIG. 6) by a first distance (e.g., the first distance d1 of FIG. 6), a second ground area (e.g., the second ground area 313*b* of FIG. 6) spaced apart from a second end area (e.g., second end area 310*b* in FIG. 6) opposite to the first end area by a second distance (e.g., the second distance d2 of FIG. 6), and a feeding area (e.g., the feeding area 314 of FIG. 6) located between the first ground area and the second ground area.

According to various embodiments, the third connecting member may surround at least a portion of the display member.

According to various embodiments, the electronic device may further include a first wiring structure electrically connected to the first antenna structure and the communication module, and a second wiring structure electrically connected to the first connecting member and the communication module.

According to various embodiments, the wearing member may each include an inner case (e.g., the inner case 231 of FIG. 4) including an inner surface (e.g., the inner surface 231*c* of FIG. 2) configured to face the user's body and an outer case (e.g., the outer case 233 of FIG. 4) including an outer surface (e.g., the outer surface 231*d* of FIG. 2) opposite to the inner surface.

According to various embodiments, the electronic device may further include a light output module (e.g., the light output module 211 of FIG. 3) configured to output an image using the display member.

According to various embodiments, the electronic device may further include at least one first camera module (e.g., the first camera module 251 of FIG. 3) configured to detect the trajectory of a user's gaze.

According to various embodiments, the electronic device may include a second camera module (e.g., the second camera module 253 of FIG. 3) configured to capture an external image and at least one third camera module (e.g., the third camera module 255 of FIG. 3) configured to image a user's motion.

According to various embodiments, the electronic device may further include a processor configured to adjust a position of a virtual image projected on the display member, wherein the processor (e.g., the processor 120 of FIG. 1) is disposed in the second wearing member.

According to various embodiments, the electronic device may further include one or more batteries (e.g., the batteries 243 of FIG. 4) disposed in the wearing member and configured to transmit power to the communication module.

According to various embodiments of the disclosure, an electronic device (e.g., the electronic device 200 in FIG. 2) may include a lens frame (e.g., the lens frame 202 of FIG. 2) configured to accommodate a display member (e.g., the display member 201 of FIG. 2), a first wearing member (e.g., the first wearing member 203*a* of FIG. 2) rotatably connected to the lens frame, a second wearing member (e.g., the second wearing member 203*a* of FIG. 2) rotatably connected to the lens frame and spaced apart from the first wearing member, a first antenna structure (e.g., the first antenna structure 311 of FIG. 3) disposed within the first wearable member, a second antenna structure (e.g., the second antenna structure 312 of FIG. 3) disposed within the second wearing member, a first connecting member (e.g., the first connecting member 321 of FIG. 4) at least partially disposed within the first wearing member, a second connecting member (e.g., the second connecting member 322 of FIG. 4) at least partially disposed within the second wearing member and electrically connected to the second antenna structure, a third connecting member (e.g., the third connecting member 323 of FIG. 4) disposed within the lens frame and electrically connected to the first connecting member and the second connecting member, and a communication module (e.g., the communication module 190 of FIG. 6) disposed within the first wearable member, electrically connected to the first antenna structure, and electrically connected to the second antenna structure via the first connecting member, the third connecting member, and the second connecting member.

According to various embodiments, the electronic device may further include a first hinge structure (e.g., the first hinge structure 229a of FIG. 2) connected to the lens frame and the first wearing member, and a second hinge structure (e.g., the second hinge structure 229b of FIG. 2) connected to the lens frame and the second wearing member.

According to various embodiments, the first connecting member may face at least a portion of the first hinge structure, and the second connecting member may face at least a portion of the second hinge structure.

According to various embodiments, the first connecting member and the second connecting member may each include a flexible printed circuit board, and the third connecting member may include a cable structure.

According to various embodiments, the third connecting member may surround at least a portion of the display member.

According to various embodiments of the disclosure, an electronic device (e.g., the electronic device 200 in FIG. 2) may include a first wearing member (e.g., the first wearing member 203a of FIG. 5A) configured to accommodate a communication module (e.g., the communication module 190 of FIG. 5A) and a first circuit board (e.g., the first circuit board 241a of FIG. 5A) electrically connected to the communication module, a second wearing member (e.g., the second wearing member 203b of FIG. 5C) configured to accommodate an antenna structure (e.g., the second antenna structure 312 of FIG. 5C) and a second circuit board (e.g., the second circuit board 241b of FIG. 5C) electrically connected to the antenna structure, a first signal transmission member (e.g., the first connecting member 321 of FIG. 5A) at least partially disposed within the first wearing member and electrically connected to the first circuit board, a second signal transmission member (e.g., the second connecting member 322 of FIG. 5C) at least partially disposed within the second wearing member and electrically connected to the second circuit board, a lens frame (e.g., the lens frame 202 of FIG. 2) configured to accommodate a third signal transmission member (e.g., the third connecting member 323 of FIG. 5B), a first hinge structure (e.g., the first hinge structure 229a of FIG. 2) physically connected to a first end (e.g., the first end 202c of FIG. 2) of the lens frame and the first wearing member and configured to guide rotation of the first wearing member relative to the lens frame, and a second hinge structure (e.g., the second hinge structure 229b of FIG. 2) physically connected to a second end (e.g., the second end 202d of FIG. 2) of the lens frame and the second wearing member and configured to guide rotation of the second wearing member relative to the lens frame, wherein an antenna structure located within the second wearing member may be configured to transmit a communication signal received by the antenna structure to the communication module located within the first wearing member via the first signal transmission member, the third signal transmission member, and the second signal transmission member.

According to various embodiments, one end of the first signal transmission member may be electrically connected to the first circuit board, at least a portion of the first signal transmission member may be electrically connected to an end of the third signal transmission member across at least a portion of the first hinge structure, and a signal generated by the communication module may be transmitted to the third signal transmission member via the first signal transmission member, and a signal received by the third signal transmission member from the second signal transmission member may be transmitted to the communication module via the first signal transmission member.

According to various embodiments, one end of the second signal transmission member may be electrically connected to the first second board, at least a portion of the second signal transmission member may be electrically connected to an end of the third signal transmission member across at least a portion of the second hinge structure, and a signal received from the antenna structure may be transmitted to the third signal transmission member via the second signal transmission member, and a signal received by the third signal transmission member from the communication module may be transmitted to the antenna structure via the second signal transmission member.

According to various embodiments, at least a portion of the first signal transmission member may be disposed within the lens frame across the first hinge structure, at least a portion of the second signal transmission member may be disposed within the lens frame across the second hinge structure, one end of the third signal transmission member may be electrically connected to the first signal transmission member located within the lens frame, and another end of the third signal transmission member may be electrically connected to the second signal transmission member located within the lens frame, and the communication module and the antenna structure may be configured to transmit a signal by using the first signal transmission member, the second signal transmission member, and the third signal transmission member.

According to various embodiments, a first thickness of the first signal transmission member and a second thickness of the second signal transmission member may be smaller than a third thickness of the third signal transmission member.

According to various embodiments, the third signal transmission member may include a first connecting area configured to be connected to the first signal transmission member and a second connecting area configured to be connected to the second signal transmission member.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device comprising:
  a lens frame accommodating a display member and including a first end and a second end opposite to the first end;

a wearing member including a first wearing member connected to the first end and a second wearing member connected to the second end;
an antenna structure including a first antenna structure disposed within the first wearing member and a second antenna structure disposed within the second wearing member;
a connecting member including:
a first connecting member at least partially disposed within the first wearing member,
a second connecting member at least partially disposed within the second wearing member and electrically connected to the second antenna structure, and
a third connecting member disposed within the lens frame and electrically connected to the first connecting member and the second connecting member; and
a communication module disposed within the first wearing member, electrically connected to the first antenna structure, and electrically connected to the second antenna structure via the connecting member.

2. The electronic device of claim 1, further comprising:
a hinge structure including a first hinge structure connected to the lens frame and the first wearing member, and a second hinge structure connected to the lens frame and the second wearing member.

3. The electronic device of claim 2,
wherein the first connecting member faces at least a portion of the first hinge structure, and
wherein the second connecting member faces at least a portion of the second hinge structure.

4. The electronic device of claim 1, wherein the first connecting member and the second connecting member each include a flexible printed circuit board.

5. The electronic device of claim 1, wherein the third connecting member includes at least one of a cable structure, a flexible printed circuit board, or an optical cable.

6. The electronic device of claim 1, further comprising:
a heat dissipation structure disposed in the wearing member,
wherein the first antenna structure and the second antenna structure are disposed to be spaced apart from the heat dissipation structure.

7. The electronic device of claim 1, wherein the antenna structure includes:
a first ground area spaced apart from a first end area by a first distance,
a second ground area spaced apart from a second end area opposite to the first end area by a second distance, and
a feeding area disposed between the first ground area and the second ground area.

8. The electronic device of claim 1, wherein the third connecting member surrounds at least a portion of the display member.

9. The electronic device of claim 1, further comprising:
a first wiring structure electrically connected to the first antenna structure and the communication module; and
a second wiring structure electrically connected to the first connecting member and the communication module.

10. The electronic device of claim 1, wherein the wearing member include an inner case including an inner surface configured to face a user's body and an outer case including an outer surface configured to face opposite to the inner surface.

11. The electronic device of claim 1, further comprising:
a light output module configured to output an image using the display member.

12. The electronic device of claim 1, further comprising:
at least one first camera module configured to detect a trajectory of a user's gaze.

13. The electronic device of claim 1, further comprising:
a second camera module configured to capture an external image; and
at least one third camera module configured to image a user's motion.

14. The electronic device of claim 1, further comprising:
a processor configured to adjust a position of a virtual image projected on the display member,
wherein the processor is disposed within the second wearing member.

15. The electronic device of claim 1, further comprising:
one or more batteries disposed within the wearing member and configured to deliver power to the communication module.

16. An electronic device comprising:
a lens frame accommodating a display member;
a first wearing member rotatably connected to the lens frame;
a second wearing member rotatably connected to the lens frame and spaced apart from the first wearing member;
a first antenna structure disposed within the first wearing member;
a second antenna structure disposed within the second wearing member;
a first connecting member at least partially disposed within the first wearing member;
a second connecting member at least partially disposed within the second wearing member and electrically connected to the second antenna structure;
a third connecting member disposed within the lens frame and electrically connected to the first connecting member and the second connecting member; and
a communication module disposed within the first wearing member, electrically connected to the first antenna structure, and electrically connected to the second antenna structure via the first connecting member, the third connecting member, and the second connecting member.

17. The electronic device of claim 16, further comprising:
a first hinge structure connected to the lens frame and the first wearing member; and
a second hinge structure connected to the lens frame and the second wearing member.

18. The electronic device of claim 17,
wherein the first connecting member faces at least a portion of the first hinge structure, and
wherein the second connecting member faces at least a portion of the second hinge structure.

19. The electronic device of claim 16,
wherein the first connecting member and the second connecting member each include a flexible printed circuit board, and
wherein the third connecting member includes a cable structure.

20. An electronic device comprising:
a first wearing member accommodating a communication module and a first circuit board electrically connected to the communication module;
a second wearing member accommodating an antenna structure and a second circuit board electrically connected to the antenna structure;
a first signal transmission member at least partially disposed within the first wearing member and electrically connected to the first circuit board;

a second signal transmission member at least partially disposed within the second wearing member and electrically connected to the second circuit board;
a lens frame accommodating a third signal transmission member;
a first hinge structure physically connected to a first end of the lens frame and the first wearing member and configured to guide rotation of the first wearing member relative to the lens frame; and
a second hinge structure physically connected to a second end of the lens frame and the second wearing member and configured to guide rotation of the second wearing member relative to the lens frame,
wherein an antenna structure located within the second wearing member is configured to transmit a communication signal received by the antenna structure to a first communication module located within the first wearing member via the first signal transmission member, the third signal transmission member, and the second signal transmission member.

* * * * *